US00RE40617E

(19) United States
(12) Reissued Patent
Canni et al.

(10) Patent Number: US RE40,617 E
(45) Date of Reissued Patent: Jan. 6, 2009

(54) OVERHEAD CONSOLE FOR A VEHICLE

(75) Inventors: Adam Canni, Marlton, NJ (US); Scott Shields, White Lake, MI (US); Clifford Krapfl, Chicago, IL (US)

(73) Assignee: International Automotive Components Group North America, Inc., Dearborn, MI (US)

(21) Appl. No.: 10/758,563

(22) Filed: Jan. 15, 2004

(Under 37 CFR 1.47)

Related U.S. Patent Documents

Reissue of:
(64) Patent No.: 6,338,517
Issued: Jan. 15, 2002
Appl. No.: 09/488,322
Filed: Jan. 20, 2000

(51) Int. Cl.
*B60R 7/04* (2006.01)
*B60R 11/00* (2006.01)
*B60R 13/02* (2006.01)
*B60R 11/04* (2006.01)

(52) U.S. Cl. ..... 296/37.8; 296/37.7; 296/214; 224/311; 224/281

(58) Field of Classification Search ..... 296/37.7, 296/37.8, 214; 224/311, 281, 548, 554
See application file for complete search history.

(56) References Cited

U.S. PATENT DOCUMENTS 1,674,340 A 6/1928 Nock
2,120,619 A 6/1938 Matthiesen
2,929,539 A 3/1960 Safreno (Continued)

FOREIGN PATENT DOCUMENTS

DE 23 59 718 A1 11/1973
DE 23 59 718 A1 * 6/1975
DE 31 51 298 A1 12/1981

(Continued)

OTHER PUBLICATIONS

Prince Corp., "Reposition Features", O–Zone Project, bearing an indication of May 10, 1996–Nov. 1, 1996 (7 pgs.).
Power Spine ®, O–Zone,m bearing and indication of "© 1996 Prince Corporation, Jul. 23, 1996" (2 pgs.).
"Innovation in the most pleasing form!", *Automotive & Transportation Interiors,* a Publication of Shore–Varrone, Inc., Nov. 1998 (1 pg.).
Johnson Controls Design, Concept Sketch, apparently dated 1994 (1 pg.).
Focus on Baden–Wurttemberg, Baden–Wurttemberg, No. 8, bearing an indication of "Updated Sep. 1998" (8 pgs.).
Sidler GmbH & Co. : Meeting the Millennium's Challenge, bearing an indication of "Version 1.2 Sep. 15, 1999" (18 pgs.).

*Primary Examiner*—Christopher P. Ellis
*Assistant Examiner*—Greg Blankenship
(74) *Attorney, Agent, or Firm*—Brooks Kushman P.C.

(57) ABSTRACT

An overhead console assembly for a vehicle includes accessory module compartments selectively positioned and removably secured to the overhead console for storing materials within the compartments. The overhead console includes a first console housing disposed to an miner surface of a structural member of a headliner assembly on a roofline of a vehicle, a second console housing disposed on the structural member of the headliner spaced apart from the first console housing and a center console housing disposed between the first and second console housings. At least one accessory module is removably secured to the center console housing. The at least one accessory module includes a housing, a storage area defined within the housing to retain materials stored within, and at least one securing member coupling the at least one module to a securement surface provided on the center console housing.

66 Claims, 2 Drawing Sheets

U.S. PATENT DOCUMENTS

| | | | | |
|---|---|---|---|---|
| 3,451,035 | A | | 6/1969 | Baldwin |
| 3,474,381 | A | | 10/1969 | Baldwin |
| 3,917,207 | A | | 11/1975 | Quigley |
| 3,984,161 | A | | 10/1976 | Johnson |
| 4,173,382 | A | | 11/1979 | Booty |
| 4,182,532 | A | | 1/1980 | Walker, Sr. |
| 4,441,641 | A | | 4/1984 | Thompson |
| 4,469,365 | A | | 9/1984 | Marcus et al. |
| 4,738,481 | A | | 4/1988 | Watjer et al. |
| 4,783,110 | A | | 11/1988 | Beukema et al. |
| 4,867,498 | A | | 9/1989 | Delphia et al. |
| 4,887,196 | A | | 12/1989 | Brown et al. |
| 4,974,129 | A | | 11/1990 | Grieb et al. |
| 4,984,725 | A | | 1/1991 | Urbom |
| 5,020,845 | A | | 6/1991 | Falcoff et al. |
| 5,040,990 | A | | 8/1991 | Suman et al. |
| 5,077,643 | A | | 12/1991 | Leach |
| 5,085,481 | A | | 2/1992 | Fluharty et al. |
| 5,113,318 | A | | 5/1992 | Conley |
| 5,128,847 | A | | 7/1992 | Lin et al. |
| 5,154,617 | A | | 10/1992 | Suman et al. |
| 5,169,097 | A | | 12/1992 | Yasukawa |
| 5,169,105 | A | | 12/1992 | Yasukawa |
| 5,180,089 | A | | 1/1993 | Suman et al. |
| 5,285,941 | A | | 2/1994 | Herrera |
| 5,303,970 | A | | 4/1994 | Young et al. |
| 5,310,237 | A | | 5/1994 | McCloy, II et al. |
| 5,522,638 | A | | 6/1996 | Falcoff et al. |
| 5,599,086 | A | | 2/1997 | Dutta |
| 5,667,896 | A | | 9/1997 | Carter et al. |
| 5,678,875 | A | | 10/1997 | Zipperle et al. |
| 5,775,762 | A | | 7/1998 | Vitito |
| 5,823,599 | A | | 10/1998 | Gray |
| 5,887,939 | A | | 3/1999 | Yamaguchi et al. |
| 5,893,603 | A | | 4/1999 | Viertel et al. |
| 5,927,784 | A | | 7/1999 | Vitito |
| 5,946,055 | A | | 8/1999 | Rosen |
| 5,954,252 | A | | 9/1999 | Gebreselassie et al. |
| 6,019,411 | A | | 2/2000 | Carter et al. |
| 6,024,262 | A | | 2/2000 | Duncan |
| 6,062,623 | A | | 5/2000 | Lemmen |
| 6,065,793 | A | | 5/2000 | Koshida et al. |
| 6,086,129 | A | | 7/2000 | Gray |
| 6,092,704 | A | | 7/2000 | Baumeister |
| 6,116,674 | A | | 9/2000 | Allison et al. |
| 6,135,529 | A | | 10/2000 | De Angelis et al. |
| 6,158,639 | A | | 12/2000 | De Silva et al. |
| 6,158,795 | A | | 12/2000 | Gray et al. |
| 6,176,536 | B1 | * | 1/2001 | Miller et al. ..... 296/37.7 |
| 6,203,088 | B1 | | 3/2001 | Fernandez et al. |
| 6,234,570 | B1 | | 5/2001 | Quinno et al. |
| 6,264,261 | B1 | | 7/2001 | Krafcik |
| 6,267,428 | B1 | | 7/2001 | Baldas et al. |
| 6,293,616 | B1 | | 9/2001 | Williams et al. |
| 6,321,960 | B1 | | 11/2001 | Ellis et al. |
| 6,575,528 | B2 | * | 6/2003 | Tiesler et al. ..... 296/214 |
| 6,619,716 | B1 | * | 9/2003 | Sturt ..... 296/37.8 |
| 6,669,260 | B2 | | 12/2003 | Clark et al. |
| 6,695,376 | B1 | * | 2/2004 | Hirano ..... 296/37.7 |
| 6,749,244 | B1 | * | 6/2004 | Song ..... 296/37.7 |
| 6,827,384 | B2 | | 12/2004 | Anderson et al. |
| 2001/0002253 | A1 | | 5/2001 | Pala et al. |
| 2002/0163219 | A1 | | 11/2002 | Clark et al. |
| 2003/0075955 | A1 | * | 4/2003 | Tiesler et al. ..... 296/214 |
| 2003/0168875 | A1 | | 9/2003 | Anderson et al. |

FOREIGN PATENT DOCUMENTS

| | | | |
|---|---|---|---|
| DE | G 86 18 079.7 | | 7/1986 |
| DE | 8618079 | U | 2/1987 |
| DE | 690 03 767 | T2 | 7/1990 |
| DE | 41 16 758 | C2 | 5/1991 |
| DE | 44 38 623 | A1 | 10/1994 |
| DE | 198 22 638 | A1 | 12/1999 |
| DE | 198 22 638 | C2 | 6/2000 |
| DE | 199 09 732 | A1 | 9/2000 |
| DE | 201 03 563 | U1 | 2/2001 |
| DE | 298 08 950 | U1 | 8/2001 |
| EP | 0 178 196 | A1 | 4/1986 |
| EP | 0 342 345 | B1 | 1/1994 |
| EP | 0 795 437 | A2 | 9/1997 |
| EP | 1 092 590 | A1 | 4/2001 |
| JP | 57-167838 | | 10/1982 |
| JP | 61-150237 | | 9/1986 |
| JP | 9-58359 | | 3/1997 |
| JP | 9-58360 | | 3/1997 |
| JP | 9-58361 | | 3/1997 |
| JP | 11-129827 | | 5/1999 |
| JP | 2001-055091 | | 2/2001 |
| WO | 99/48724 | | 9/1999 |

* cited by examiner

OVERHEAD CONSOLE FOR A VEHICLE

Matter enclosed in heavy brackets [ ] appears in the original patent but forms no part of this reissue specification; matter printed in italics indicates the additions made by reissue.

TECHNICAL FIELD

The present invention relates to an overhead console assembly for the interior of a vehicle.

BACKGROUND ART

Overhead consoles are provided on the interior roof structures of vehicles such as automobiles, boats and airplanes. Overhead consoles generally are centrally mounted on the longitudinal axis of the headliner of the vehicle roof. Overhead consoles are designed to provide passengers of the vehicle additional storage space for items such as sunglasses, garage door openers and compact discs.

Current overhead console systems include a series of accessory compartments for storing items of the passengers in the vehicle. The accessory compartments are pivotally mounted to the console to allow the passenger to stow and retrieve personal items in the console. Additionally, overhead consoles house vehicle accessories and controls for vehicle components, including overhead lighting fixtures and controls for vehicle air conditioning systems. Many overhead consoles further include television monitors and the like which are installed in the vehicle for viewing by the passengers.

Once the overhead consoles have been assembled in the vehicle, additional accessory compartments not previously installed cannot be added to the console without a complete rebuild of the console. For example, a garage door opener mechanism cannot be installed into an overhead console unless the console was originally built to house the device. Further, accessory compartments fixed in the overhead consoles do not allow vehicle passengers to rearrange the positioning of each compartment based on driver or passenger preference. Finally, passengers cannot remove the accessory compartments from the console to transport the stored items. Rather, the items must be removed from the compartments prior to exiting the vehicle.

Therefore, it is desirable to provide an overhead console assembly in a vehicle having module accessory compartments that can be easily removed, replaced or rearranged by the occupants of the vehicle.

DISCLOSURE OF INVENTION

The present invention overcomes the above-referenced problems associated with prior overhead console assemblies by providing an overhead console assembly for a vehicle having accessory module compartments removably secured to the overhead console for storing materials within the compartments. [The] *In one embodiment of the invention, the* overhead console assembly *may* include[s] a first console housing disposed [to an inner surface of a structural member of] *on* a headliner assembly mounted to a roofline of a vehicle, a second console housing disposed on [the structural member of] the headliner of the vehicle spaced apart from the first console housing and a center console housing disposed between the first and second console housings. At least one accessory module for storing materials within the overhead console of the vehicle is removably secured to the center console housing. The at least one module includes a housing, a storage area defined within the housing to retain the materials stored there within, and at least one securing member coupling the at least one module to at least one securement surface provided on the center console housing.

In a first embodiment of the invention, the overhead console assembly includes a first console housing disposed to an inner surface of a structural member of a headliner assembly mounted to a roofline of a vehicle, a second console housing disposed on the structural member of the headliner spaced apart from the first console housing and a center console housing disposed between the first and second console housings. The first and second console housing may be either attached to or integrally formed as part of the structural member of the headliner assembly of the vehicle.

The center console housing disposed between the first and second console housing includes at least one rail extending between and secured to the first and second console housings. In one embodiment of the invention, a pair of rails are spaced apart between and attached to the first and second console housings. Each rail has a securement surface provided about the outer periphery of the rail to receive the securing members of the at least one accessory module and an inner surface defining a cavity therein which receives electrical wiring or the like. The at least one accessory module includes a housing, a storage area defined within the housing to retain the materials and a gripping portion extending from each end of a lower surface of the housing to engage the outer surface of each of the pair of spaced apart rails to secure the module to the center console housing. The at least one accessory module is selectively repositionable on and within the center console housing for the convenience of the occupants of the vehicle.

In a second embodiment of the invention, the overhead console assembly includes a first console housing disposed on an inner surface of a structural member of a headliner assembly mounted to a roofline of a vehicle, a second console housing disposed on the structural member of the headliner spaced apart from the first console housing and a center console housing disposed between the first and second console housings mounted on the structural member of the headliner. The center console housing disposed between the first and second console housings comprises an upper surface substantially flush to the inner surface of structural member of the headliner, a pair of sidewalls extending vertically from the upper surface between the first and second console housings, and a cavity defined there between. At least one securement surface is provided in the cavity of the center console housing. In an alternative embodiment of the present invention, the first, second and center console housings are integrally formed as part of the structural member of the headliner assembly of the vehicle.

At least one accessory module is selectively positioned removably secured in the center console housing. The at least one module of the second embodiment of the invention includes a lower surface, an overlapping flap portion extending from the lower surface a storage area formed between the lower surface and flap portion and an upper surface having a fastening material, such as a hook and loop fastener, which engages the at least one securement surface in the cavity of the center console housing to secure the at least one module in the cavity. The at least one module is selectively repositionable within the cavity of the center console housing based on the convenience of the occupants of the vehicle. The overlapping flap portion of the at least one module is removably fastened to the lower surface to enclose materials within the storage area.

The above objects and other objects, features and advantages of the present invention are readily apparent from the following detailed description of the best mode for carrying out the invention when taken in connection with the accompanying drawings.

DETAILED DESCRIPTION OF THE PREFERRED EMBODIMENT

Figure 1:
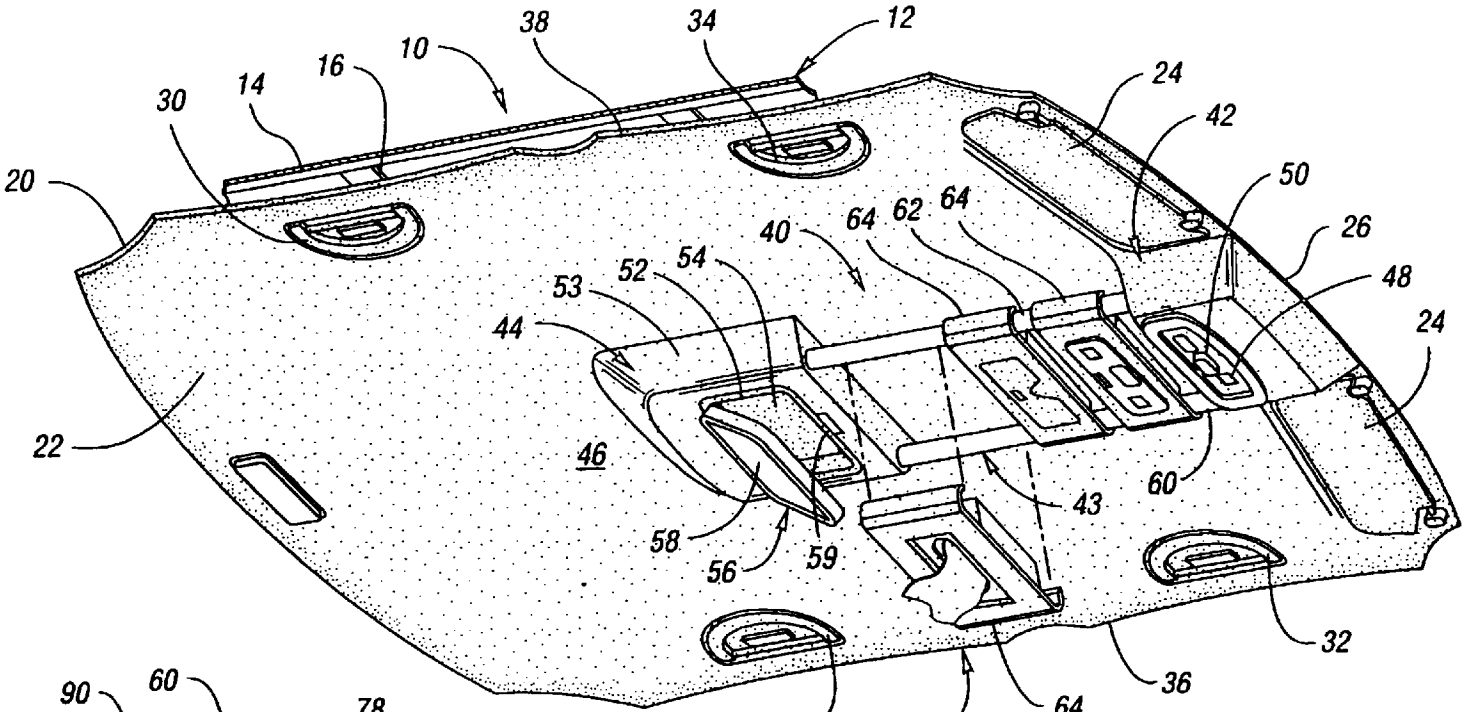
FIG. 1 shows a fragmentary perspective view of a first embodiment of a modular overhead console assembly for a vehicle wherein a plurality of removably secured accessory modules are disposed on a pair of spaced apart rails in accordance with the present invention.

Referring to FIG. 1, a roof structure 10 of a vehicle is shown in accordance with the present invention. The roof structure 10 is comprised of a roof panel 12 having an outer surface 14 and an inner surface 16. Typically, roof panel 12 is formed as a one piece, stamped structure. However, roof panel 12 can be formed as a one piece structure using two pieces, wherein outer roof surface 14 is crimped around the outer periphery of inner roof surface 16 to complete construction of the one piece roof panel 12.

A headliner assembly 18 includes a structural member 20 which is secured to the inner surface 16 of roof panel 12 by fasteners or the like. The upper surface of headliner assembly 18 covers the inner surface 16 of roof panel 12. The headliner assembly 18 comprises a structural member 20 and an overlay 22 applied to a lower surface of structural member 20. Structural member 20 of headliner assembly 18 is molded to provide contour surfaces defining or complementary to the shape of the interior roof of the vehicle. The overlay 22 of headliner assembly 18 is comprised of a polymer such as polypropylene or the like. Overlay 22 is placed over the lower or interior surface of structural member 20 and is secured by adhesive applied between the overlay 22 and the lower surface of structural member 20.

The structural member 20 of headliner assembly 18 includes a series of mounting structures adapted to receive and secure interior components of the vehicle. The most common interior components provided on the headliner assembly 18 include a pair of visors 24 mounted at a front edge 26 of the headliner 18, as well as grab handles 28, 30 and interior lights 32, 34 mounted on opposing sides 36, 38 of the headliner assembly 18. It is understood that any number of additional components can be mounted to the headliner assembly for use in a vehicle, including clothes hooks and additional interior reading lights.

Figure 2:
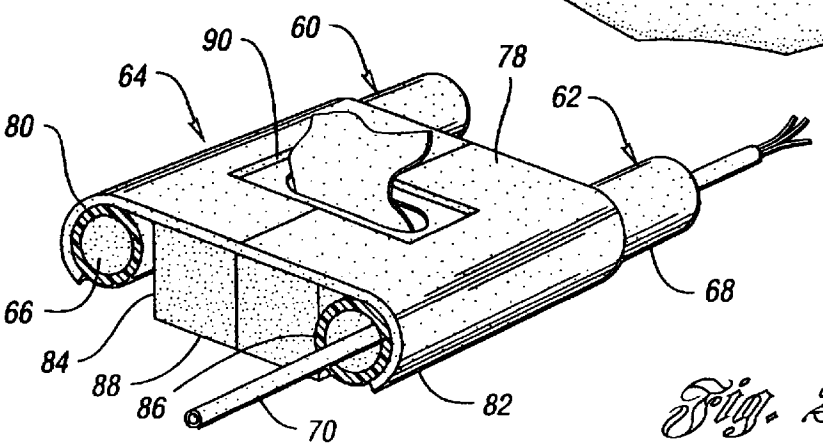
FIG. 2 shows a perspective view of an accessory module of the first embodiment of the modular overhead console assembly of the present invention.

Referring now to FIGS. 1 and 2, overhead console assembly 40 is centrally disposed along the longitudinal axis of headliner assembly 18. Overhead console assembly 40 includes a first console housing 42, a center console housing 43 and a second console housing 44. In the preferred embodiment of the invention, first console housing 42 of overhead console assembly 40 is disposed on structural member 20 of headliner assembly 18 between visors 24 at a front edge 26 of headliner 18. In another embodiment of the invention, first console housing 42 is integrally molded as part of structural member 20 of headliner assembly 18. The first console housing 42 of overhead console assembly 40 is adapted to receive a number of interior components, including, but not limited to, overhead reading lights 48 and an electronic information center 50. First console housing 42 includes a pair of apertures (not shown) which receive a pair of rails 60, 62 of center console housing 43 extending between the first and second console housings 42, 44.

Second console housing 44 of overhead console assembly 40 is disposed on a central portion 46 of structural member 20 of headliner assembly 18. Second console housing 44 is assembled to the structural member 20 of headliner assembly 18 with a series of fasteners (not shown). This allows a manufacturer to vary the length of the overhead console assembly based on the assembly portion of the second console housing 44. In the preferred embodiment of the invention, second console housing 44 is disposed rearward of first console housing 42 along the longitudinal axis of the structural member 20. However, it is understood that the first and second console housings 42, 44 could be disposed parallel to and spaced apart from one another along the lateral axis of the structural member 20. In an alternative embodiment of the invention, second console housing 44 is molded as part of structural member 20 of headliner assembly 18.

Second console housing 44 is substantially rectangular in shape, having vertically extending sidewalls 52 terminating at a lip 53 disposed about the outer periphery of sidewalls 52. A cavity 54 is defined between the vertically extending sidewalls 52 of second console housing 44. Second console housing 44 includes a pair of apertures (not shown) adapted to receive and secure rails 60, 62 of center console housing 43. An audiovisual display 56 is pivotally mounted within the cavity 54 of second console housing 44. The display 56 is secured in cavity 54 by a set of fasteners covered by a trim bezel (not shown). Display 56 is pivotally adjustable between a raised or inactive position and an active or lowered position, which is shown in FIG. 1.

When the audiovisual display 56 is in the inactive or stored position, the display 56 is disposed within cavity 54 such that the viewing surface 58 of display 56 is substantially flush with the outer periphery 52 of second console housing 44. A latch 59 is provided on the outer periphery 52 of second console housing 44 of overhead console assembly 40 to lock the display in cavity 54 while stored in the inactive position. When the audiovisual display is placed in the active or lowered position, the display 56 is substantially perpendicular to the lower surface of headliner 18. It is understood that the monitor could be pivotally adjusted to any number of positions relative to the lower surface of headliner assembly 18 for use by the passengers of the vehicle.

In a first embodiment of the invention, center console housing 43 of overhead console assembly 40 includes a pair of rails 60, 62 mounted between the first and second console housings 42, 44. The rails 60, 62 are substantially parallel to one another and are spaced apart to receive at least one accessory module 64 there between. As described above, rails 60, 62 can be formed to any length to extend between first and second console housing 42, 44. Rails 60, 62 are formed by an extrusion process using either a metallic material, such as aluminum, or a polymeric material, such as polypropylene or the like. Rails 60, 62 are generally cylindrical in shape to allow accessory modules 64 mounted on the rails to be adjusted longitudinally along the surface of the rails. It is easily understood that rails 60, 62 can be formed to have any geometrical shape which would allow for the mounting and adjustment of the removably secured accessory modules 64 along the rails based on the convenience of the occupants of the vehicle.

In an alternative embodiment of the invention, a single rail is provided as part of the center console housing 43 extending between the first and second console housings 42, 44. The at least one accessory module 64 is selectively positionable and removably secured to the single rail in center console housing 43. It is also understood that the number of rails provided in center console housing 43 of overhead assembly 40 can be changed to provide additional structural support to mount the accessory modules 64 or to change the aesthetic appearance of the overhead assembly.

Referring now to FIG. 2, each rail 60, 62 includes a hollow inner surface 66 and a securement surface 68 provided about the outer periphery of the rails. Electrical wiring 70 connecting the interior components of overhead console assembly 40 to the vehicle's electrical system, including overhead lights 48, information center 50 and audiovisual display 56 is disposed within the hollow inner surface 66 or rails 60, 62.

At least one accessory module 64 is selectively positionable and removably secured on rails 60, 62. The accessory modules 64 are adapted to be repositioned along and removed from the spaced apart rails 60, 62 of center console housing 43 based on the convenience of the occupants of the vehicle. Accessory modules 64 receive and retain personal items or materials of the passengers in the vehicle. Examples of the type of accessory modules that can be mounted to the overhead console assembly 40 include, but are not limited to, a tissue dispenser module 72, a sunglass holder module 74 and a universal garage door opener module 76. Each of the accessory modules can have different geometries and features based on the type of materials to be retained in the module and still be secured to center console housing 43.

Each accessory module 64 includes a substantially planar lower surface 78 terminating at each end at a gripping portion 80, 82. The gripping portions 80,82 are adapted to engage the securement surface 68 of rails 60, 62 to mount the accessory module 64 to the rails. In the preferred embodiment, gripping portions 80, 82 are arcuate shaped to engage the cylindrical outer periphery of securement surface 68 of rails 60, 62. However, it is understood that the position, geometry and number of gripping portions provided on the accessory modules may be changed to mount the accessory modules to the overhead assembly.

The accessory module 64 further includes a storage receptacle formed by vertically extending side walls 84, 86 terminating at a substantially planar top surface 88. The storage receptacle formed by the vertically extending side walls 84, 86 and top surface 88 extends into the area defined between the spaced apart rails 60, 62. Passengers access the materials in the storage receptacle through an entry 90 formed in the substantially planar lower surface 78. It should be understood that the entry for each accessory module 64 can be varied based on the purpose of the module. For example, tissue dispenser module 72 has a rectangular entry formed in the lower surface to provide access to the tissue stored in the receptacle.

It can be further understood that in another embodiment of accessory module 64 of the present invention, accessory module 64 includes an aperture formed in the lower surface 78 of the accessory module 64 above a cavity in module 64 which may receive a number of interchangeable accessory components. The aperture and cavity are defined by the vertically extending sidewalls 84, 86 and top surface 88 of accessory module 64. For example, universal garage door opener module 76 receives a removable garage door opener device mounted in the storage cavity through the aperture in lower surface 78. If the passenger decides to replace the garage door opener device, he removes the device from the storage cavity, replacing the device with another container in the accessory module, such as a sunglass carrier.

Figures 3, 4, 5, 6:
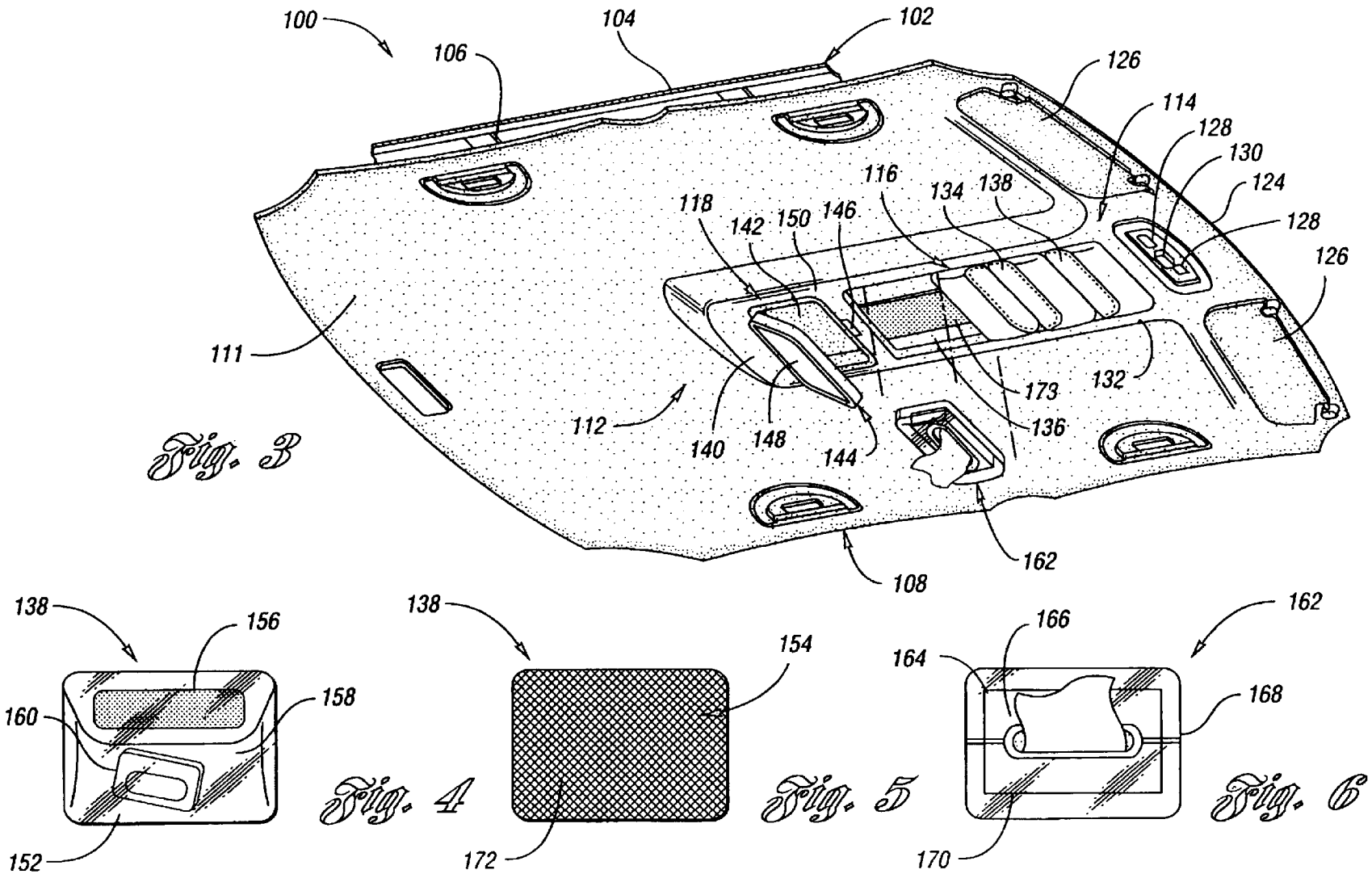
FIG. 3 shows a fragmentary perspective view of the second embodiment of the modular overhead console assembly for a vehicle, wherein a plurality of detachably coupled accessory modules are disposed in the center console housing of the overhead console assembly of a vehicle in accordance with the present invention.
FIG. 4 shows a top plan view of a lower surface of the second embodiment of the modular overhead console assembly of the present invention.
FIG. 5 shows a bottom plan view of an upper surface of the second embodiment of the modular overhead console assembly of the present invention.
FIG. 6 shows a top plan view of another accessory module of the second embodiment of the modular overhead console assembly of the present invention.

Referring now to FIG. 3, a second embodiment of the modular overhead console for a vehicle of the present invention is disclosed. Vehicle roof 100 comprises a roof panel 102 having an outer surface 104 and an inner surface 106. An upper surface of a structural member 110 of headliner assembly 108 is secured to the inner surface 106 of roof panel 102 by fasteners (not shown).

The headliner 108 of vehicle roof 100 comprises a structural member 110 and an overlay 111 applied to a lower surface of the structural member 110. Overhead console assembly 112 includes a first console housing 114, a center console housing 116 and a rear console housing 118. Each of the housings forming the overhead console assembly 112 is aligned with an adjacent housing and is centrally disposed along the longitudinal axis of structural member 110 of headliner assembly 108. However, it is understood that the housings of overhead console assembly may be aligned with one another along the lateral axis of the structural member 110 of headliner assembly 108.

In the second embodiment of the invention shown in FIG. 3, first console housing 114, center console housing 116 and second console housing 118 are molded as part of the structural member 110 of headliner 108. Overlay 111 extends over each console housing of overhead console assembly 112. In another embodiment of the invention, first console housing 114, enter console housing 116 and second console housing 118 can be individually secure to the headliner assembly 108 by fasteners. Additionally, each housing can be assembled together to form the overhead console assembly 112 prior to assembly on the structural member 11 of headliner assembly 108.

First console housing 114 of overhead console assembly 112 is disposed at a front edge 124 of headliner 108. A pair of visors 126 are secured on each side of first housing 114. The first housing 114 of overhead console assembly 112 is adapted to receive interior components, such as overhead lights 128 and an electronic information center 130.

Center console housing 116 of overhead console assembly 112 includes a pair of vertical sidewalls 132, 134 extending longitudinally from first console housing 114. Electrical wiring (not shown) is provided in the cavities formed by vertically extending sidewalls 132, 134 to electrically connect components in the first and second console housing 114, 118 to the vehicle electrical system. A cavity 136 in center console housing 116 is defined between vertically extending sidewalls 132, 134 and first and second console housings 114, 118. Cavity 136 is provided substantially flush to the structural member 110 of headliner assembly 108 and is adapted to removably secure and detachably couple at least one accessory module or pouch 138 therewithin with a hook and loop fastening system, which will be described in greater detail below.

Second console housing 118 of overhead console assembly 112 is disposed adjacent center console housing 116. Second console housing 118 is formed by the vertically extending sidewalls 132, 134 and an end wall 140 extending between the terminal portions of sidewalls 132, 134. A cavity 142 is defined between the vertically extending sidewalls 132, 134, the end wall 140 and center console housing 116 to receive an audiovisual display 144.

Audiovisual display 144 is pivotally mounted within the cavity 142 of second console housing 118 to be adjusted between a raised or inactive position and an active or lowered position. A latch 146 is provided in cavity 142 to engage and lock the audiovisual display 144 when the display is placed in the inactive or stored position. When stored, viewing surface 148 of display 144 is substantially flush with the outer periphery 150 of second console housing 118.

Referring additionally now to FIGS. 4–6, the accessory module or pouch 138 of the alternative embodiment of the modular overhead console of the present invention will be discussed in greater detail. Accessory pouch 138 includes a lower surface 152, an upper surface 154, a flap 156 and a storage cavity 158 formed by the upper and lower surfaces 152, 154. Items 160, such as a garage door opener or the like, are stowed in the storage cavity 158. Items 160 are retained in cavity by flap 156, which is releasably secured to the lower surface of accessory pouch 138 by means of a fastener, such as a snap fastener or a hook and loop fastener.

As is seen in FIG. 6, another embodiment of an accessory module or pouch is disclosed. Accessory pouch 162 is formed as a tissue dispenser having a lower surface 164 including an aperture 166, an upper surface 168 and a storage cavity 170 defined there between. The accessory modules or pouches 138, 162 are generally formed of a polymeric material. In the preferred embodiment of the invention, accessory pouches 138, 162 are formed of a transparent polymeric material to allow passengers of the vehicle to view the contents of the pouch. It is understood that accessory pouches 138, 162 can be formed to have different geometries and features based on the types of materials to be retained in the module and still be secured to center console housing 116.

Accessory modules or pouches 138, 162 include a hook and loop fastening material 172 provided on the upper surface 154 of accessory pouch 138 to selectively position and removably secure mount the at least one accessory pouch to a securement surface in the cavity 136 of center console housing 116. When the accessory pouch is placed in cavity 146, hook and loop fastening material 172 interconnects with the overlay 111 provided in cavity 136 to detachably couple and secure the accessory pouch 138 in position. Overlay 111 acts as a securement surface to removably secured the accessory pouches to center console housing 116.

In another embodiment of the invention, a hook and loop fastener securement panel 173 is mounted within cavity 136 and is provided as the securement surface of the center console housing to engage fastening material 172 of accessory pouches 138, 162 to provide a more secure interconnection between the center console housing and the accessory pouches than that provided by overlay material 111. It is understood that accessory pouches 138, 162 of overhead console assembly 112 are selectively repositionable and removable within cavity 136 of center console housing 116 based on the convenience of the occupants of the vehicle.

While the best mode for carrying out the invention has been described in detail, those familiar with the art to which this invention relates will recognize various alternative designs and embodiments for practicing the invention within the scope of the appended claims.

What is claimed is:

1. An overhead console assembly and headliner combination for a vehicle comprising:

a [headlliner] *headliner* including a [support] *structural* member;

a first console housing disposed on the structural member of the headliner;

a second console housing disposed on the structural member of the headliner, wherein the second console housing is spaced apart from the first console housing;

a center console housing disposed between the first and second console housings, the center console housing including at least one securement surface, each of the at least one securement surface forming only an outer surface of the center console housing; and at least one accessory module selectively positionable on and removably secured to the at least one securement surface of the center console housing for storing materials, the at least one accessory module including a housing, a storage area defined within the housing to retain materials within and at least one securing member engaging the at least one securement surface of the center console housing.

2. The combination of claim 1, wherein the center console housing comprises a pair of spaced apart rails extending between and secured to the first and second console housings, wherein each rail includes a securement surface disposed about an outer periphery of the rail and an inner surface forming a cavity.

3. The combination of claim 2, wherein the rails are formed of extruded aluminum.

4. The combination of claim 2, wherein each of the rails is generally cylindrical in shape.

5. The combination of claim 2, wherein the housing of the at least one accessory module includes a lower surface having opposite ends, and the at least one securing member of the at least one accessory module comprises a gripping portion extending from each end of the lower surface, each gripping portion engaging the securement surface of a respective rail.

6. The combination of claim 2, wherein each rail is generally cylindrical in shape, and each gripping portion is arcuately shaped.

7. The combination of claim 1, wherein the structural member of the headliner has a lower surface, and wherein the center console housing comprises an upper surface substantially flush to the lower surface of the structural member of the headliner, a pair of sidewalls extending vertically from the upper surface between the first and second console housings, and a cavity defined therebetween.

8. The combination of claim 7, wherein the upper surface and the pair of sidewalls extending vertically from the upper surface of the center console housing are integrally formed with the structural member of the headliner.

9. The combination of claim 8, wherein the first console housing and center console housing are integrally formed as part of the structural member of the headliner.

10. The overhead console assembly of claim 7, wherein the at least one securement surface of the center console housing is an overlay placed over the inner surface of the structural member of the headliner.

11. The overhead console assembly of claim 7, wherein the housing of the at least one accessory module secured in the center console housing further comprises an upper surface including the at least one securing member, a lower surface forming the storage area and an overlapping flap portion extending from the lower surface, wherein the overlapping flap portion is removably fastened to the lower surface to enclose the storage area.

12. An overhead console assembly for use with a vehicle having a headliner, the headliner including a structural member having a lower surface, the overhead console assembly comprising:

a first console housing disposable on the lower surface of the structural member;

a second console housing disposable on the lower surface of the structural member in spaced relationship with the first console housing;

a center console housing disposed between the first and second console housings, wherein the center console housing includes at least one generally cylindrical rail extending between and secured to the first and second console housings, the at least one rail having an outer surface; and at least one accessory module selectively positionable along and removably secured to the at least one rail of the center console housing for storing materials, the at least one accessory module including a housing, a storage area defined within the housing to retain the materials and at least one securing member engaging the at least one rail only at the outer surface of the at least one rail.

13. The overhead console assembly of claim 12, wherein the at least one rail of the center console housing comprises a pair of generally cylindrical, spaced apart rails extending between and secured to the first and second console housings, wherein each rail includes a securement surface disposed about an outer periphery of the rail and an inner surface forming a cavity.

14. The overhead console assembly of claim 13, wherein the rails are formed of extruded aluminum.

15. The overhead console assembly of claim 13, wherein the housing of the at least one accessory module includes a lower surface having opposite ends, and the at least one securing member of the least one accessory module comprises a gripping portion extending from each end of the lower surface, each gripping portion engaging the securement surface of a respective rail.

16. The overhead console assembly of claim 15, wherein each gripping portion is arcuately shaped.

17. An overhead console assembly for a vehicle comprising:

a first console housing disposed on an inner surface of a structural member of a headliner of the vehicle;

a second console housing disposed on the inner surface of the structural member of the headliner, wherein the second console housing is spaced apart from the first console housing;

a center console housing disposed between the first and second console housings, wherein the center console housing comprises an upper surface substantially flush to the inner surface of the structural member of the headliner, a pair of sidewalls extending vertically from the upper surface between the first and second console housings, a cavity defined there between, and at least one securement surface disposed within the cavity; and at least one accessory module selectively positioned and removably secured in the center console housing, the at least one module comprising a lower surface, an overlapping flap portion extending from the lower surface, a storage area formed between the lower surface and flap portion and an upper surface having at least one securing member attached thereto for securing the at least one module in the center console housing.

18. The overhead console assembly of claim 17, wherein the first console housing and center console housing are integrally formed as part of the structural member of the headliner.

19. The overhead console assembly of claim 17, wherein the overlapping flap portion of the at least one accessory module is removably fastened to the lower surface of the at least one module to enclose the storage area.

20. The overhead console of claim 17, wherein the at least one securing member of the at least one accessory module is a hook and loop fastening panel secured to the upper surface of the at least one module.

21. The overhead console assembly of claim 20, wherein the at least one securement surface of the center console housing is an overlay placed over the inner surface of the structural member of the headliner.

22. The overhead console assembly of claim 20, wherein the at least one securement surface of the center console housing is a hook and loop fastening panel secured within the cavity of the center console housing.

23. The combination of claim 1 wherein the center console housing comprises at least one rail having a longitudinally extending securement surface disposed at an outer periphery of the at least one rail such that the securement surface forms only an outer surface of the at least one rail, and the at least one securing member of the at least one accessory module removably engages the at least one rail only at the securement surface.

24. The combination of claim 1 wherein the at least one rail comprises polymeric material.

25. The combination of claim 1 wherein the center console housing comprises a pair of spaced apart rails, each rail having a securement surface disposed about an outer periphery of the rail such that the securement surface forms only an outer surface of the rail, the at least one securing member of the at least one accessory module includes two securing members that engage the rails only at the securement surfaces so as to removably secure the at least one accessory module to the rails, and the housing of the at least one accessory module includes two vertically extending side walls disposed between the rails when the at least one accessory module is secured to the rails, the side walls defining the storage area of the at least one accessory module.

26. The combination of claim 1 wherein the center console housing comprises a pair of spaced apart rails, each rail having a securement surface disposed about an outer periphery of the rail such that the securement surface forms only an outer surface of the rail, the at least one securing member of the at least one accessory module includes two securing members that engage the rails only at the securement surfaces so as to removably secure the at least one accessory module to the rails, and the storage area of the at least one accessory module is disposed entirely between the two rails when the at least one accessory module is secured to the rails.

27. The overhead console assembly of claim 12 wherein the at least one rail comprises polymeric material.

28. The overhead console assembly of claim 12 wherein the at least one rail comprises two spaced apart rails, and the housing of the at least one accessory module includes two vertically extending side walls disposed between the rails when the at least one accessory module is secured to the rails, the side walls defining the storage area of the at least one accessory module.

29. The overhead console assembly of claim 12 wherein the at least one rail comprises two rails, and the storage area of the at least one accessory module is disposed entirely between the two rails when the at least one accessory module is secured to the rails.

30. An overhead console assembly and headliner combination for use with a vehicle, the combination comprising:

a headliner;

a first console housing disposed on the headliner;

a second console housing disposed on the headliner, wherein the second console housing is spaced apart from the first console housing;

a center console housing disposed between the first and second console housings, the center console housing including a pair of spaced apart rails extending between and secured to the first and second console housings, wherein each of the rails includes a securement surface disposed about an outer periphery and an inner surface forming a cavity; and at least one accessory module selectively positionable on and removably secured to the securement surfaces of the center console housing for storing materials, the at least one accessory module including a housing, a storage area defined within the housing to retain materials, and at least one securing member engaging the securement surfaces of the center console housing.

31. The combination of claim 30 wherein the rails are formed of extruded aluminum.

32. The combination of claim 30 wherein each of the rails is generally cylindrical in shape.

33. The combination of claim 30 wherein the housing of the at least one accessory module includes a lower surface having first and second ends, and the at least one securing member of the least one accessory module includes first and second gripping portions, the first gripping portion extending from the first end, and the second gripping portion extending from the second end, each gripping portion engaging the securement surface of a respective rail.

34. The combination of claim 33 wherein each rail is generally cylindrical in shape, and each gripping portion is arcuately shaped.

35. The combination of claim 30 wherein the rails comprise polymeric material.

36. The combination of claim 30 wherein the housing of the at least one accessory module includes two vertically extending side walls disposed between the rails, the side walls defining the storage area of the at least one accessory module.

37. The combination of claim 30 wherein the storage area of the at least one accessory module is disposed entirely between the two rails when the at least one accessory module is secured to the rails.

38. An overhead console assembly and headliner combination for use with a vehicle, the overhead console assembly comprising:

a headliner;

a first console housing disposed on the headliner;

a second console housing disposed on the headliner and spaced apart from the first console housing;

a center console housing disposed between the first and second console housings, the center console housing including two spaced apart rails extending between the first and second console housings; and an accessory module selectively positionable on and removably securable to the rails, the module including a housing having vertically extending side walls that extend between the rails when the module is secured to the rails, the side walls defining a storage receptacle.

39. The combination of claim 38 wherein the storage receptacle is disposed entirely between the rails when the module is secured to the rails.

40. The combination of claim 38 wherein each rail has a generally cylindrical shape, and wherein the housing of the module includes a lower surface having first and second ends, the module further comprising first and second arcuately shaped gripping portions respectively extending from the first and second ends, each gripping portion being engageable with a respective rail.

41. The combination of claim 38 wherein the rails are formed of polymeric material.

42. The combintaion of claim 38 wherein each rail includes a securement surface disposed about an outer periphery of the rail, and an inner cavity, and wherein the module includes two securing members, each securing member being engageable with a respective securement surface.

43. The combintaion of claim 42 wherein when the securing members are engaged with the securement surfaces, the securing members do not extend into the cavities.

*44. An overhead console assembly for use with a vehicle having a roof, the overhead console assembly comprising:*

*a first console housing mountable in the vehicle proximate the roof;*

*a second console housing mountable in the vehicle such that the second console housing is spaced apart from the first console housing;*

*two spaced apart rails mountable in the vehicle proximate the roof, wherein the rails extend between the first and second console housings when the assembly is mounted in the vehicle; and*

*an accessory module selectively positionable on and removably securable to the rails such that the module extends between the rails when the module is secured to the rails, wherein the module is removable from the rails and repositionable along the rails by a vehicle occupant when the assembly is mounted in the vehicle.*

*45. The assembly of claim 44 wherein the first and second console housings are configured to be disposed on a headliner of the vehicle when the assembly is mounted in the vehicle.*

*46. The assembly of claim 44 further comprising a headliner that is mountable in the vehicle adjacent the roof, wherein the first and second console housings are disposed on the headliner when the assembly is mounted in the vehicle.*

*47. The assembly of claim 46 wherein the first and second console housings are integrally formed with the headliner.*

*48. The assembly of claim 44 further comprising an electrically powered device associated with the second console housing, and electrical wiring associated with one of the rails for providing electrical power to the electrically powered device.*

*49. The assembly of claim 48 wherein the electrical wiring extends along the one rail.*

*50. The assembly of claim 48 wherein the electrical wiring extends through the one rail.*

*51. The assembly of claim 48 wherein the second console housing is located rearward of the first console housing when the assembly is mounted in the vehicle.*

*52. The assembly of claim 44 wherein the module includes walls that extend between the rails when the module is secured to the rails, the walls cooperating to define a storage receptacle.*

*53. The assembly of claim 44 wherein the module defines a storage receptacle that is disposed entirely between the rails when the module is secured to the rails.*

*54. The assembly of claim 44 wherein the rails are configured to extend longitudinally in the vehicle when the assembly is mounted in the vehicle, and the module is longitudinally positionable along the rails.*

*55. An overhead console assembly for use with a vehicle having a roof, the overhead console assembly comprising:*

*a first console housing mountable in the vehicle proximate the roof;*

*a second console housing mountable in the vehicle such that the second console housing is spaced apart from the first console housing;*

*a center console housing mountable in the vehicle proximate the roof, such that the center console housing is disposed between the first and second console housings when the assembly is mounted in the vehicle, the center console housing including at least one securement surface, each of the at least one securement surface forming only an outer surface of the center console housing; and*

*an accessory module selectively positionable on and removably securable to the at least one securement surface of the center console housing, the module including at least one securing member that is selectively engageable with the at least one securement surface of the center console housing, wherein the module is removable from the at least one securement surface and repositionable along the at least one securement surface by a vehicle occupant when the assembly is mounted in the vehicle.*

*56. The assembly of claim 55 further comprising an electrically powered device associated with the second console housing, and electrical wiring associated with the center console housing for providing electrical power to the electrically powered device.*

*57. The assembly of claim 55 wherein the first and second console housings are configured to be disposed on a headliner of the vehicle when the assembly is mounted in the vehicle.*

*58. The assembly of claim 55 further comprising a headliner that is mountable in the vehicle, the headliner including an overlay that defines the at least one securement surface, and wherein the first and second console housings are disposed on the headliner when the assembly is mounted in the vehicle.*

*59. The assembly of claim 55 wherein the center console housing comprises a pair of spaced apart rails, and each rail includes a securement surface disposed about an outer periphery of the rail.*

*60. The assembly of claim 59 wherein the at least one securing member comprises two gripping portions, each gripping portion being engageable with the securement surface of a respective rail.*

*61. The assembly of claim 55 wherein the center console housing includes a pair of sidewalls that define a cavity for receiving the module.*

*62. The assembly of claim 55 wherein the module is longitudinally positionable along the at least one securement surface.*

*63. An overhead console assembly for use with a vehicle having a roof, the overhead console assembly comprising:*

*a console housing mountable in the vehicle proximate the roof, the console housing including at least one securement surface; and*

*an accessory module selectively positionable on and removably securable to the at least one securement surface of the console housing, the module including at least one securing member that is selectively engageable with the at least one securement surface of the console housing, wherein the module is removable from the at least one securement surface and repositionable along the at least one securement surface by a vehicle occupant when the assembly is mounted in the vehicle;*

*wherein the at least one securement surface and the at least one securing member comprise a hook and loop fastening system.*

*64. An overhead console assembly for use with a vehicle having a roof, the overhead console assembly comprising:*

*a console housing mountable in the vehicle proximate the roof, the console housing including at least one securement surface; and*

*an accessory module selectively positionable on and removably securable to the at least one securement surface of the console housing, the module including at least one securing member that is selectively engageable with the at least one securement surface of the console housing, wherein the module is removable from the at least one securement surface and repositionable along the at least one securement surface by a vehicle occupant when the assembly is mounted in the vehicle, and wherein the module includes an upper surface that includes the at least one securing member, a lower surface, a storage area disposed between the upper and lower surfaces, and a flap portion that is configured to overlap the lower surface to enclose the storage area.*

*65. The assembly of claim 63 wherein each of the at least one securement surface forms only an outer surface of the console housing.*

*66. The assembly of claim 64 wherein each of the at least one securement surface forms only an outer surface of the console housing.*

* * * * *